Figure 1:
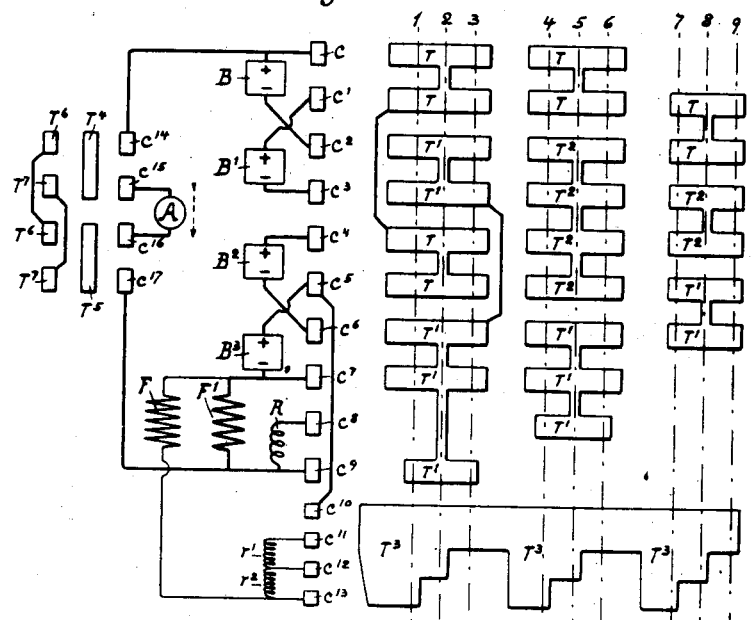

No. 711,667. Patented Oct. 21, 1902.
R. LUNDELL.
MEANS FOR REGULATING ELECTRIC MOTORS.
(Application filed May 10, 1902.)
(No Model.)

Witnesses
A. Lindball
M. F. Keating

Inventor
Robert Lundell

UNITED STATES PATENT OFFICE.

ROBERT LUNDELL, OF NEW YORK, N. Y.

MEANS FOR REGULATING ELECTRIC MOTORS.

SPECIFICATION forming part of Letters Patent No. 711,667, dated October 21, 1902.

Application filed May 10, 1902. Serial No. 106,728. (No model.)

*To all whom it may concern:*

Be it known that I, ROBERT LUNDELL, a citizen of the United States, residing in New York, borough of Manhattan, county and State of New York, have made a new and useful Invention in Means for Regulating Electric Motors, of which the following is a specification.

My present invention relates particularly to the regulation of electric motors used in connection with storage batteries or similar sources of electromotive forces and is specially applicable to motors propelling electric cars or vehicles.

The generic features of the invention are somewhat similar to those described and claimed in a prior United States patent, No. 626,178, granted to me on the 30th day of May, 1899.

The invention has for its chief objects, first, to provide means for controlling the speed of electric motors by varying the field strength and the electromotive force applied to the armature-terminals in a manner hereinafter described and claimed; second, to provide means whereby all external resistance in series with the armature can be dispensed with without jeopardizing the smoothness of the regulation; third, to so vary the strength and character of the field-magnet of the motor at the different notches on a speed-regulating controller, in combination with variations in the voltage supplied to the armature, that the motor will automatically become a generator, charging the batteries, (a) when the controller is moved from a notch of high speed to one of lower speed, thus checking the speed of the vehicle, and (b) when the vehicle is running downhill; fourth, to so increase the efficiency of the motor when acting as a generator that it always may be used as a recharging-generator in the station by uncoupling the driving-gear of the vehicle and connecting the motor-shaft to any suitable source of power; fifth, to provide means for varying the voltage at the armature-terminals and the strength and character of the field-magnet in a manner that will cause the recharging feature to become effective down to such a slow speed of the vehicle that the ordinary power-wasting band-brake at the end of the armature-shaft can be entirely dispensed with and the speed of the vehicle may be wholly governed by the controller.

Briefly expressed, the invention consists of the combination of an electric motor, a storage battery (or the equivalent thereof) and a speed-regulating controller for connecting the various cells of the battery into series-parallel combinations and for changing the strength and character of the field-magnet of the motor in such a manner that the field strength is practically independent of the armature-current for the slower speed, but highly responsive to variations in the armature-current for the highest speeds.

For a clear understanding of the invention reference is made to the accompanying drawings, in which—

Figure 2:
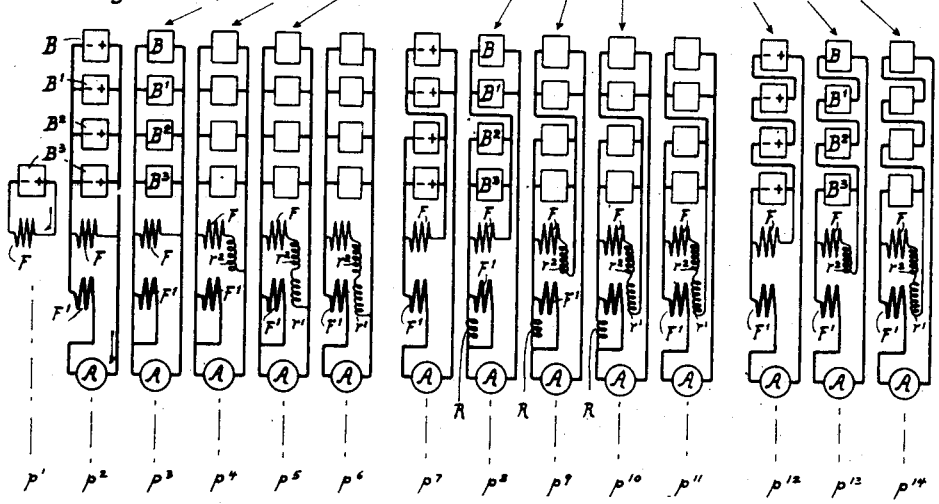

Figure 1 illustrates the stationary and the developed movable contacts in a controller of the "cylinder" type. This figure shows also the circuit connections between the stationary contacts of the controller, the batteries, and the motor. Fig. 2 is a diagrammatic view of various combinations of the motor and the battery-circuits when the movable contacts on the controller-cylinder are rotated over the stationary right-hand contacts shown in Fig. 1.

Referring again to Fig. 1, $c\ c'\ c^2$, &c., to $c^{13}$ represent the stationary contacts for the main switch or speed-regulating controller, and T, T', T², and T³ represent the movable contacts upon the controller-cylinder, said contacts being shown in plan development. $c^{14}, c^{15}, c^{16}$, and $c^{17}$ represent the stationary contacts for a reversing-switch, the movable contacts of said switch being represented by T⁴, T⁵, T⁶, and T⁷. B, B', B², and B³ are groups of storage-battery cells of a capacity and voltage best suited for the motor and the vehicle. A represents the armature of the said motor, and F and F' represent the field-windings of the same. R is a low resistance used as a shunt for the field-winding F' at certain positions of the controller, and $r'$ and $r^2$ are resistances arranged to be connected in series with the field-winding F.

It will be noticed upon inspection of Fig. 1 that the field-winding F is connected across the group of storage-battery cells marked B³ when the speed-controlling switch is closed and that the other field-winding F' when in circuit is connected in series with the armature. These field-windings are both arranged to give he same polarities to the field-magnet poles when the motor works as a motor—that is to say, when the current flows from the positive terminal of the battery through the armature and field-winding F' of the motor back to the negative terminal of the battery.

The numbers 1, 2, 3, to 9, inclusive, above the lines shown in "dot and dash" on Fig. 1 indicate the various running positions or "notches" on the controller-cylinder. The circuit connections at these positions between the battery groups, the armature, and the field-magnet coils are fully illustrated in Fig. 2 by diagrams $p^3$ $p^4$ $p^5$, $p^8$ $p^9$ $p^{10}$, $p^{12}$ $p^{13}$ and $p^{14}$. There are, however, other important circuit combinations between the above-mentioned positions which will be fully pointed out in the detailed description of the mode of operation.

Assuming now that the reversing-switch shown on the left-hand side of Fig. 1 is closed, causing contact $c^{14}$ to be connected with contact $c^{15}$ and contact $c^{16}$ with contact $c^{17}$, the mode of operation may be described as follows: The main speed-controlling switch, with its movable contacts T, T', $T^2$, and $T^3$, is supposed to be moved or rotated (from right to left) into contact with the stationary contacts $c$, $c'$, $c^2$, to $c^{13}$, inclusive. By reason of the contact $T^3$ extending farther to the left than any other it follows that contact $c^{10}$ will be connected to contacts $c^{11}$, $c^{12}$, and $c^{13}$ before any other connection is made. This causes the field-winding F to become separately and fully excited by a current from the lower group of battery-cells $B^3$, as illustrated by diagram $p'$ in Fig. 2 at the extreme left of the drawings. A further movement of the switch causes contacts $c$, $c'$, $c^4$, and $c^5$ to become connected together, likewise contacts $c^2$, $c^3$, $c^6$, and $c^7$—that is to say, the four battery groups have become connected in parallel and current is now flowing from the + side of the battery groups through the armature A in the direction of the dotted arrow, through the field-winding F', and back to the negative side of the battery groups. (See Fig. 1.) This is, in fact, the starting position, the circuit connections being fully shown by diagram $p^2$ in Fig. 2. It will be understood that the current required for starting has been forced to flow through the field-winding F', thus producing in connection with the other field-winding the most powerful field strength. The next movement of the switch causes the stationary contacts $c^7$ and $c^9$ to become connected. The field-winding F' is thereby short-circuited, and the field strength is now solely dependent upon the current flowing through the other winding F and is independent of the current flowing through the armature. This is the first running position No. 1, (indicated in Fig. 1 by a line in dot and dash and in Fig. 2 by the diagram marked $p^3$.) At the second running position (see line under position No. 2 in Fig. 1) the circuit connections are retained as they were in the first position, with the exception that the resistance $r^2$ has been connected in series with the field-winding F, thus reducing the field strength and causing the armature and the vehicle to run at an increased speed. The diagram $p^4$ in Fig. 2 illustrates fully all the circuits. Position No. 3 on the controller is similar to No. 2, with the exception that the field strength has been further reduced by means of an additional resistance $r'$, connected in series with the field-winding F. Said resistances $r'$ and $r^2$ are so proportioned that the speed of the armature has increased about sixty per cent. to seventy per cent. since the first position of the controller. The diagram $p^5$ in Fig. 2 illustrates the connections as this third running position. A further movement of the switch causes the field-winding F' to be momentarily cut into the armature-circuit by reason of the contacts $c^7$ and $c^9$ being disconnected ahead of the other stationary contacts. This is a transition step or position, which is illustrated by the diagram $p^6$ in Fig. 2. As the speed-regulating switch is moved on the armature and the battery circuits become completely severed at the next moment, the only circuit which is still closed being the one through the field-winding F and the resistances $r'$ and $r^2$. Before the armature and battery circuits are again reëstablished the resistances $r'$ and $r^2$ are cut out, so that the field-winding F will again become fully excited. It will be seen from Fig. 1 that when the armature and battery circuits are again closed the battery groups B and B' are still connected in parallel, but that they are connected in series with the other two groups $B^2$ and $B^3$, which also remain in parallel with each other, as before. It will also be seen that at the moment the circuits are closed the field-winding F' is connected in series with the armature. This is for the purpose of causing the field strength to become considerably increased in case the speed of the armature should be such that any great amount of current would flow through its windings. The diagram $p^7$ in Fig. 2 will give a clear idea of the circuit connections during this transition step. As the switch is moved onto the fourth position contacts $c^7$ and $c^8$ become connected, which causes the low resistance R to become connected in parallel with the field-winding F'. This resistance is so proportioned that it will shunt about seventy-five to eighty per cent. of the current, which otherwise would flow through the field-winding F'. If now the maximum amount of ampere-turns from the field-windings F' (at normal torque of the motor) is about equal to the ampere-turns from the field-winding F at the lowest excitation when both of the resistances $r'$ and $r^2$ are in series with the same, it follows that the effect of the field-winding F' upon the field strength will be very slight at this fourth position of the controller. (See diagram $p^8$ in Fig. 2.) In other words, the field strength, and consequently the speed, is still practically independent of the armature-current; but as the switch is moved on and positions 5 and 6 are successively reached and the field strength is reduced by reason of the resistances $r^2$ and $r'$ again being connected in series with the field-winding F the field-winding F' will commence to influence the general field strength. It will thus be understood that at position No. 6 of the controller (see diagram $p^{10}$ in Fig. 2) the field strength of the motor, and consequently the speed of the vehicle, becomes somewhat responsive to variations in the armature-current. In other words, if the vehicle should happen to go uphill the field strength would be somewhat increased and the speed correspondingly decreased. A further movement of the switch causes the field-winding F' to be completely cut into the armature-circuit during another transition step, the utility of which will be explained later. (See diagram $p^{11}$ of Fig. 2.) As the switch is moved on the armature and the battery connections are again severed. The next instant the resistances $r^2$ and $r'$ are again cut out, causing the field-winding F to yield its maximum amount of ampere-turns, and when position No. 7 is reached the battery groups B, B', B², and B³ are all connected in series with each other and with the armature and the field-coil F', as clearly shown by diagram $p^{12}$ of Fig. 2. It should now be pointed out that although the excitation of the field is quite great from the field-winding F alone the other winding F' (not being shunted) will increase the field strength if it should happen that a strong current would be flowing through the armature-circuit in the direction of the dotted arrow. (See Fig. 1.) The influence of the said field-winding F' will of course increase as the ampere-turns of the other field-winding F are again successively reduced at positions Nos. 8 and 9 of the controller. (See diagrams $p^{13}$ and $p^{14}$ of Fig. 2.) It follows, then, that if the vehicle were ascending a grade the field strength would be materially increased and the speed reduced, which in turn would save the battery from too great a rate of discharge, it being of great importance that the rate of discharge should not be too great when the cells are all in series.

It will now be understood from the above description that the speed of the vehicle at the three first notches or positions of the controller will be practically independent of the direction or the strength of the armature-current. The batteries will of course have ample ampere capacity when connected in parallel, and no harm to the batteries can result from the fact that the character of the field strength is of such a nature that the motor will "fight" or take current through its armature in proportion to the required torque. At the three next positions of the controller there is still enough ampere capacity in the various groups of batteries to permit the field strength to be fairly independent of the armature-current; but at the three last positions of the controller, when the cells are in series and the voltage is four times as great as in the three first positions, great care must be taken that the permissible rate of discharge may not be exceeded. For this reason the character of the field strength has been changed in a manner that will cause the motor to reduce its speed at heavy loads—i. e., it will automatically increase its field strength and will thus limit the current flowing through the armature.

It will of course be understood from the foregoing description that the motor will have a very wide range of speed, from the slowest speed at low voltage and strong field to the highest speed at four times the voltage with a weak field. The battery-cells in B³, which are called upon to furnish current for the field-winding F, may preferably be of somewhat greater capacity than the other cells.

Supposing now that the controller is at the last notch and the vehicle is running at a high rate of speed, it will be evident that as the controller or switch is moved toward the off position the momentum of the vehicle will soon cause the motor to work as a dynamo, recharging the batteries and checking the speed of the vehicle. The checking will be quite gentle at first, owing to the fact that as the current reverses in the armature it will also reverse its direction in the field-winding F', and thus reduce the field strength; but even at the seventh position of the switch the checking effort and the recharging capacity will be considerable on account of the strong field from the winding F. As the controller is moved on toward the off position the motor becomes more and more efficient as a dynamo, checking the speed of the vehicle and recharging the batteries until at the first position of the controller the speed of the vehicle is reduced to a minimum and the recharging action ceases. As the speed is extremely low at the first notch, a slight pressure on the ordinary foot-brake will bring the vehicle to rest when the switch is thrown to the off position.

The general operation of the motor as a recharging-dynamo now being understood, the utility of the transition steps previously referred to and illustrated by diagrams $p^{11}$, $p^7$, $p^6$, and $p^2$ should be pointed out. Assuming, then, that the speed of the vehicle is being rapidly reduced by the controller being thrown from a position of fairly high speed to one of considerably lower speed—for instance, from position No. 5 to No. 3 or No. 2—it becomes evident that unless the field strength can be made to respond instantaneously there is danger of shock to the apparatus as the controller goes over from position No. 4 to No. 3 because of the sudden change in voltage. In other words, it becomes necessary to reduce the field strength instantaneously. This is accomplished by the joint action of the two field-windings in the following manner: At position No. 4 the motor will be doing heavy duty as a recharging generator driven by the vehicle, the field being very strong; but as transition step $p^7$ is reached the field-winding F' is cut in, reducing the field strength on account of the reversed current in said winding. The ampere-turns of the field-winding F are next reduced, and in case the field strength or the field flux should not simultaneously respond to the reduction in ampere-turns the demagnetizing effect of the current in the field-coil F' as the circuits are again closed will effectively prevent a too sudden recharging action and a consequent shock to the apparatus.

The transition steps may thus be said to soften or cushion the effect of the motor upon the vehicle at the series-parallel changes of the battery-circuits. Should the vehicle be running downhill, the motor will of course work efficiently as a recharging-generator at any position of the controller (dependent upon the desired speed) from the first notch to and inclusive of the seventh notch.

Recharging at the station can conveniently be done by uncoupling the driving-gear for the vehicle and running the motor as a dynamo from any suitable source of motive power. The controller will then govern the rate of charging precisely as if the vehicle were running down a long hill, and the usual instruments at the foot of the dashboard will indicate how and when the batteries are charged. The finishing charge should be made at a speed corresponding to any of the first three notches when the batteries are in parallel.

Having thus described my invention, what I claim, and desire to secure by Letters Patent of the United States, is—

1. In an electrically-propelled vehicle the combination with an electric motor and two or more groups of batteries arranged to be connected in parallel or in series to the motor by a speed-regulating controller, of means for causing the field strength of the motor to become practically independent of the armature-current when the batteries are connected in parallel, but responsive to variations in the armature-current when the batteries are connected in series, substantially as described.

2. The combination with an electric motor of two or more groups of electric batteries, a circuit-changing switch or controller for connecting the various groups of batteries to the motor in parallel or in series; means, such as a separately-excited field, for causing the speed of the motor to become practically independent of the armature-current when the battery groups are in parallel, with other means for causing the speed to become responsive to fluctuations in the armature-current when the battery groups are in series and when the series-parallel changes of the battery-circuits are made.

3. An electric motor of the regenerative type the speed of which is chiefly governed by changes of the electromotive force applied to the commutator or armature terminals; in combination with means, such as series coils momentarily cut into the main circuit, for automatically adjusting the field strength at the time the above-mentioned changes of electromotive force are effected.

4. The combination of an electric-circuit controller, an electric motor or motors the speed of which is chiefly governed by changes of the electromotive force applied to the armature-windings, means for automatically adjusting the field strength, i. e. strengthening or weakening the same, at the time the said changes of electromotive force are effected, with additional means for keeping the field strength practically independent of the armature-current after said changes are effected, so that the motor may be driven by its load as a generator and the changes of electromotive force may be effected without shock to the apparatus.

In testimony whereof I have signed my name to this specification in the presence of two subscribing witnesses.

ROBERT LUNDELL.

Witnesses:
JAMES P. J. MORRIS,
M. F. KEATING.